US010827180B2

(12) United States Patent
Filippov et al.

(10) Patent No.: US 10,827,180 B2
(45) Date of Patent: Nov. 3, 2020

(54) METHOD AND APPARATUS FOR DATA HIDING IN PREDICTION PARAMETERS

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/262,726

(22) Filed: Jan. 30, 2019

(65) Prior Publication Data

US 2019/0166369 A1 May 30, 2019

Related U.S. Application Data

(63) Continuation of application No. PCT/RU2016/000508, filed on Aug. 4, 2016.

(51) Int. Cl.
*H04N 19/139* (2014.01)
*H04N 19/463* (2014.01)
(Continued)

(52) U.S. Cl.
CPC ......... *H04N 19/139* (2014.11); *H04N 19/107* (2014.11); *H04N 19/159* (2014.11);
(Continued)

(58) Field of Classification Search
None
See application file for complete search history.

(56) References Cited

U.S. PATENT DOCUMENTS

2006/0120559 A1* 6/2006 Levy ..................... G06T 1/0028 382/100
2007/0092103 A1 4/2007 Mihcak et al.
(Continued)

FOREIGN PATENT DOCUMENTS

CN 101165699 A 4/2008
CN 101340579 A 1/2009
(Continued)

OTHER PUBLICATIONS

Sharp et al, "Digital Video Authentication with Motion Vector Watermarking," 2010 4th International Conference on Signal Processing and Communication Systems, pp. 1-4, Institute of Electrical and Electronics Engineers—New York, New York (Feb. 4, 2011).
(Continued)

*Primary Examiner* — Christopher G Findley
(74) *Attorney, Agent, or Firm* — Leydig, Voit & Mayer, Ltd.

(57) ABSTRACT

A decoding device and a decoding method for decoding a target information from a bitstream of video data are provided, wherein the bitstream comprises a prediction parameter encoded in the bitstream. The decoding device is configured to calculate a randomized host signal based on the prediction parameter and a pseudo-random signal, and to apply a check function to the randomized host signal and thereby obtain the target information. An encoding device and an encoding method, and computer-readable storage media for encoding and for decoding are also disclosed.

14 Claims, 13 Drawing Sheets calculating a randomized host signal

310 applying a check function to the randomized host signal

320

300

(51) Int. Cl.

| | |
|---|---|
| ***H04N 19/467*** | (2014.01) |
| ***H04N 19/107*** | (2014.01) |
| ***H04N 19/159*** | (2014.01) |
| ***H04N 19/196*** | (2014.01) |
| ***H04N 19/513*** | (2014.01) |
| *H04N 19/593* | (2014.01) |

(52) U.S. Cl.

CPC ......... *H04N 19/196* (2014.11); *H04N 19/463* (2014.11); *H04N 19/467* (2014.11); *H04N 19/521* (2014.11); *H04N 19/513* (2014.11); *H04N 19/593* (2014.11)

(56) References Cited

U.S. PATENT DOCUMENTS

| | | | |
|---|---|---|---|
| 2011/0135143 A1* | 6/2011 | Zou | G06T 1/0021 382/100 |
| 2012/0093226 A1 | 4/2012 | Chien et al. | |
| 2013/0235936 A1 | 9/2013 | Campbell et al. | |

FOREIGN PATENT DOCUMENTS

| | | |
|---|---|---|
| CN | 101453656 A | 6/2009 |
| CN | 103152578 A | 6/2013 |
| EP | 2544143 A1 | 1/2013 |

OTHER PUBLICATIONS

Yann et al, "A Comparative Study of Different Modes of Perturbation for Video Watermarking Based on Motion Vectors," pp. 1-4, 2004 12th European Signal Processing Conference (Apr. 6, 2015).

Pei et al, "A Video Watermarking Scheme Based on Motion Vectors and Mode Selection," pp. 1-5, 2008 International Conference on Computer Science and Software Engineering (Dec. 22, 2008).

Qiu et al, "A hybrid watermarking scheme for H.264/AVC video," Proceedings of the 17th International Conference on Pattern Recognition, ICPR 2004, Institute of Electrical and Electronics Engineers—New York, New York (Sep. 20, 2004).

Wang et al, "Multiple Sign Bits Hiding for High Effiency Video Coding," pp. 1-6, 2012 Visual Communications and Image Processing (Jan. 17, 2013).

"Future video coding: Joint Exploration Model 1 (JEM1) for future video coding investigation," TD 213 (WP 3/16), Geneva, pp. 1-20, International Telecommunication Union (Oct. 12-23, 2015).

Sullivan et al, "Overview of the High Efficiency Video Coding (HEVC) Standard," IEEE Transactions on Circuits and Systems for Video Technology, vol. 22, No. 12, pp. 1-20, IEEE—Institute of Electrical and Electronics Engineers—New York, New York (Dec. 2012).

"Series H: Audiovisual and Multimedia Systems Infrastructure of audiovisual services—Coding of moving video, Advanced video coding for generic audiovisual services," ITU-T H.264, pp. 1-807, ITUT—International Union of Telecommunication—Geneva, Switzerland (Feb. 2016).

"Series H: Audiovisual and Multimedia Systems Infrastructure of audiovisual services—Coding of moving video High efficiency video coding," pp. 1-634, ITU-T H.265, ITUT—International Union of Telecommunication—Geneva, Switzerland (Apr. 2015).

Taehyun Kim et al., "Video watermarking technique for H.264/AVC," Optical Engineering vol. 51(4), 047402, pp. 1-12 (Apr. 2012).

Jung-Ah Choi et al., "Method of CABAC Transform Coefficient Coding for HEVC Decoder with High Throughput Rate," 26th Workshop on Image Processing and Image Understanding (IPIU), total 10 pages (Feb. 2014). with English translation.

* cited by examiner

METHOD AND APPARATUS FOR DATA HIDING IN PREDICTION PARAMETERS

CROSS-REFERENCE TO RELATED APPLICATIONS

This application is a continuation of International Application No. PCT/RU2016/000508, filed on Aug. 4, 2016, the disclosure of which is hereby incorporated by reference in its entirety.

TECHNICAL FIELD

Embodiments of the present invention relate to a decoding device, a coding device, a method for decoding a target information and a method for encoding a target information.

Embodiments of the invention also relate to a computer-readable storage medium storing program code, the program code comprising instructions for carrying out such a method.

BACKGROUND

Digital video communication and storage applications are implemented by a wide range of digital devices, e.g., digital cameras, cellular radio telephones, laptops, broadcasting systems, video teleconferencing systems, etc. Video coding standards, such as ITU-T H.264/AVC or ITU-T H.265/HEVC, provide a good tradeoff between two contradicting parameters: compression efficiency and computational complexity State-of-the-art video coding standards are based on partitioning of a source picture into blocks. Processing of these blocks depends on their size, spatial position and a coding mode specified by an encoder. Coding modes can be classified into two groups according to the type of prediction: intra- and inter-prediction modes. Intra-prediction modes use pixels of the same picture to generate reference samples to calculate the prediction values for the pixels of the block being reconstructed. Intra-prediction is also referred to as spatial prediction. Inter-prediction modes are designed for temporal prediction and use reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). Intra- as well as inter-prediction modes currently use signals which may involve some redundancy.

In inter-prediction modes, the displacement of a reference block (a part of a previously encoded picture) relative to a predicted block (in H.265, a prediction unit) is represented by a motion vector that may be referred to herein as the current motion vector $mv^{cur}$. Rather than explicitly encoding it, the current motion vector $mv^{cur}$ can be specified as a motion vector difference $\Delta mv$ relative to a predicted motion vector $mv_i^{mvc}$. The predicted motion vector is selected from a list of motion vector candidates and is specified by an index i. The list of motion vector candidates comprises k motion vectors $mv_i^{mvc}$ (i=0, k−1) that are derived prior to deriving the current motion vector $mv^{cur}$. The motion vector candidates $mv_i^{mvc}$ (i=0, k−1) can be motion vectors of prediction units of the current frame or of an earlier frame. The current motion vector can be expressed as $mv^{cur}=mv_i^{mvc}+\Delta mv$; only the index i and the motion vector difference $\Delta mv$ are indicated in the bitstream. In many implementations, the motion vector difference is encoded as two elements: a horizontal offset and a vertical offset. Each element may be preceded by a non-zero flag. If the non-zero flag indicates the offset is zero, no further data regarding that element need be encoded. If non-zero, then the magnitude of the element/offset is encoded followed by a sign bit indicating whether the offset is positive or negative. In HM and JEM software, the motion vectors have a fixed precision. However, for higher motion speed, less precision will be sufficient. So, the precision of the vector is a source of redundancy in the side information generated by an encoder at the prediction stage.

Despite recent advances, current algorithms may still comprise some redundancy and there is still a need for improved compression efficiency.

SUMMARY OF THE INVENTION

The objective of the present invention is to provide a decoding device for decoding a target information and a coding device for encoding a target information, wherein the decoding device and the coding device overcome one or more of the above-mentioned problems of the prior art.

A first aspect of the invention provides a decoding device for decoding a target information from a bitstream of video data, wherein the bitstream comprises a prediction parameter encoded in the bitstream, the decoding device comprising:

- a computation unit configured to calculate a randomized host signal based on the prediction parameter and a pseudo-random signal, and
- a check unit configured to apply a check function to the randomized host signal and to thereby obtain the target information.

The check function yields a check value which is the target information.

The decoding device of the first aspect can take advantage of redundancy in motion vectors and intra-prediction modes for further increasing a coding gain.

The decoding device of the first aspect is based on the insight that the representation of prediction information (for both inter- (e.g., motion vectors) and intra- (e.g., intra prediction mode index) modes) can involve some redundancy. More specifically, the precision of prediction information (e.g., the number of bits used for motion vector or representation) is often higher than necessary. This may occur when the precision of prediction information is not adequately changed subject to coding parameters such as motion speed, block size, etc.

One idea is to exploit (and thus minimize or remove) this redundancy by using a data hiding mechanism that modifies the values of the least significant bits of the prediction information (i.e. motion vectors or intra-prediction mode indices) to absorb some other useful information. This other useful information is referred to herein as the hidden information or the target information. The target information may comprise, e.g., parameters of prediction filters such as a reference sample smoothing filter for intra-prediction and an interpolation filter for inter-prediction. Modifying the least significant bits will not cause considerable quality degradation if the precision of prediction information is redundant (i.e. higher than required for representing only the prediction information).

In other words, the device of the first aspect can exploit the redundant precision of motion vectors and intra prediction mode indexes by a mechanism of data hiding in motion vectors and intra prediction mode indexes.

In a first implementation of the decoding device according to the first aspect, the prediction parameter comprises a motion vector difference and/or an intra-prediction mode index.

Experiments have shown that the motion vector difference, e.g., particular components of the motion vector differences, and/or one or more intra-prediction mode indices are particularly suitable for carrying the target information.

In a second implementation of the decoding device according to the first aspect as such or according to the first implementation of the first aspect, the pseudo random signal is determined based on syntax elements of the bitstream which are coded in bypass mode.

This has the advantage that the encoder and decoder do not require a pseudo random signal generator, thus making design simpler. Another advantage is that pseudo-random signal generation is not based on some pre-defined sequence of symbols. The fact that binary symbols encoded in bypass mode have equal probability of zero and one values makes it possible to use decoded video content for randomization purposes.

In a third implementation of the decoding device according to the first aspect as such or according to any of the preceding implementations of the first aspect, the pseudo random signal is determined based on motion vector candidates, in particular as $$R = \sum_{i=0}^{k-1} (|mv_{ix}^{mvc}| + |mv_{iy}^{mvc}|),$$

wherein R is the pseudo random signal, $mv_{ix}^{mvc}$ is an horizontal component of an i-th motion vector candidate, and $mv_{iy}^{mvc}$ is a vertical component of an i-th motion vector candidate.

This represents an efficient way of computing the pseudo random signal based on motion vector candidates.

In a fourth implementation of the decoding device according to the first aspect as such or according to the third implementation of the first aspect, the motion vector candidates are taken from a merging candidate list.

The merging candidate list is a set of motion vectors that can be used to reduce motion vector signaling by indicating the index of a motion vector within this list instead of explicit coding of motion vector components. A PU that is coded in inter-predicted mode can have a merging candidate list assigned with it. This list typically contains motion vectors of PUs that are spatial and temporal neighbors of the PU being coded. The merging candidate list contains motion vectors that are very different from each other in order to provide less redundancy in coding the index within this list, so that different encoded index values do not provide a similar prediction signal. This fact leads to randomization of motion vectors stored in the merging candidate list. Thus, taking the motion vector candidates from the merging candidate list has the advantage that randomization is not performed by a pre-defined sequence, but using video content itself. Another advantage of this approach can be that the design of the encoder and the decoder becomes simpler as both do not require storing or generating some predefined sequence.

In a fifth implementation of the decoding device according to the first aspect as such or according to any of the preceding implementations of the first aspect, the computation unit is configured to compute the randomized host signal by summing a non-randomized host signal, which is based on the prediction parameter, and the pseudo-random signal.

This represents a particularly efficient implementation.

In a sixth implementation of the decoding device according to the first aspect as such or according to any of the preceding implementations of the first aspect, the computation unit is configured to compute the non-randomized host signal as $$C=(|\Delta mv_x^{cur}|+|\Delta mv_y^{cur}|)$$

wherein C is the non-randomized host signal, $\Delta mv_x^{cur}$ is a horizontal component of a motion vector decoded from the bitstream, and $\Delta mv_y^{cur}$ is a vertical component of a motion vector decoded from the bitstream.

This represents a particularly efficient implementation.

A second aspect of the invention refers to a coding device for encoding a target information in a bitstream of video data, the coding device comprising:

- a computation unit configured to, for a plurality of candidate prediction parameter values, calculate a randomized host signal based on the candidate prediction parameter value and a pseudo random signal,
- a selection unit configured to select from the plurality of candidate prediction parameter values a target prediction parameter value for which a check function yields the target information when the check function is applied to the randomized host signal calculated for the target prediction parameter value, and
- a coding unit configured to encode the target prediction parameter value in the bitstream.

The coding device of the second aspect can be configured to encode the target information such that it can be decoded from the bitstream using a decoding device of the first aspect of the invention.

In an embodiment, the coding unit is an entropy coding unit, e.g., an entropy coding unit as specified in H.264 or H.265.

In a preferred embodiment, the pseudo random signal is determined based on motion vector candidates, in particular as $$R = \sum_{i=0}^{k-1} (|mv_{ix}^{mvc}| + |mv_{iy}^{mvc}|),$$

wherein R is the pseudo random signal, $mv_{ix}^{mvc}$ is an horizontal component of an i-th motion vector candidate, and $mv_{iy}^{mvc}$ is a vertical component of an i-th motion vector candidate. This represents an efficient way of computing the pseudo random signal based on motion vector candidates.

Preferably, the motion vector candidates are taken from a merging candidate list.

In a first implementation of the coding device of the second aspect, the prediction parameter comprises a motion vector difference and/or an intra-prediction mode index.

In a second implementation of the coding device of the second aspect as such or according to the first implementation of the second aspect, the target prediction parameter value is encoded in the bitstream only if a non-randomized host signal based on the target prediction parameter value is larger than a predetermined host signal threshold.

Making the decision to encode the target prediction parameter value (and thus the target information) in the bitstream based on whether the non-randomized host signal value is larger than a predetermined threshold has the advantage that it provides a way to distinguish cases that are better suited for data hiding from cases that are less suited.

It is based on the fact that when host signal is smaller than some threshold value modification of host signal has generally higher RD-cost than in cases when host signal is greater than the threshold value. It is possible to select such a value of a predetermined threshold that encoder and decoder will skip encoding of target prediction parameter value for cases when this encoding increases RD-cost.

A third aspect of the invention refers to a method for decoding a target information from a bitstream of video data, wherein the bitstream comprises a prediction parameter encoded in the bitstream, the method comprising:

- calculating a randomized host signal based on the prediction parameter and a pseudo random signal, and
- applying a check function to the randomized host signal to thereby obtain the target information.

The methods according to the third aspect of the invention can be performed by the decoding device according to the first aspect of the invention. Further features or implementations of the method according to the third aspect of the invention can perform the functionality of the decoding device according to the first aspect of the invention and its different implementation forms.

A fourth aspect of the invention refers to a method for encoding a target information in a bitstream of video data, the method comprising:

- for a plurality of candidate prediction parameter values, calculating a randomized host signal based on the candidate predictor parameter value and a pseudo random signal,
- selecting a target prediction parameter value from the plurality of candidate prediction parameter values for which a check function yields the target information when the check function is applied to the randomized host signal calculated for the selected target prediction parameter, and
- encoding the target prediction parameter value in the bitstream.

The methods according to the fourth aspect of the invention can be performed by the coding device according to the second aspect of the invention. Further features or implementations of the method according to the fourth aspect of the invention can perform the functionality of the coding device according to the second aspect of the invention and its different implementation forms.

In a first implementation of the method of the fourth aspect, the method further comprises a step of deciding whether to encode the target information in the bitstream for a given prediction parameter value:

- determining a plurality of equivalent prediction parameter values that yield a same check function as the given prediction parameter value,
- generating a plurality of predicted signals for the plurality of equivalent prediction parameter values, and
- deciding to encode the target information in the given prediction parameter value if a sum of differences of the plurality of predicted signals is smaller than a predetermined threshold.

Equally, this procedure can be applied during decoding to determine whether target information was encoded in the bitstream.

In a second implementation of the method of the fourth aspect, selecting the target prediction parameter value comprises a step of selecting a lowest-cost prediction parameter value, wherein the lowest-cost prediction parameter value has a lowest rate-distortion cost.

This has the advantage that a rate-distortion of the resulting bitstream is minimized.

A fifth aspect of the invention refers to a computer-readable storage medium storing program code, the program code comprising instructions which when executed by a processor carry out the method of the third or fourth aspect or one of the implementations of the third or fourth aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, but modifications on these embodiments are possible without departing from the scope of the present invention as defined in the claims.

DETAILED DESCRIPTION OF THE EMBODIMENTS

Figure 1:
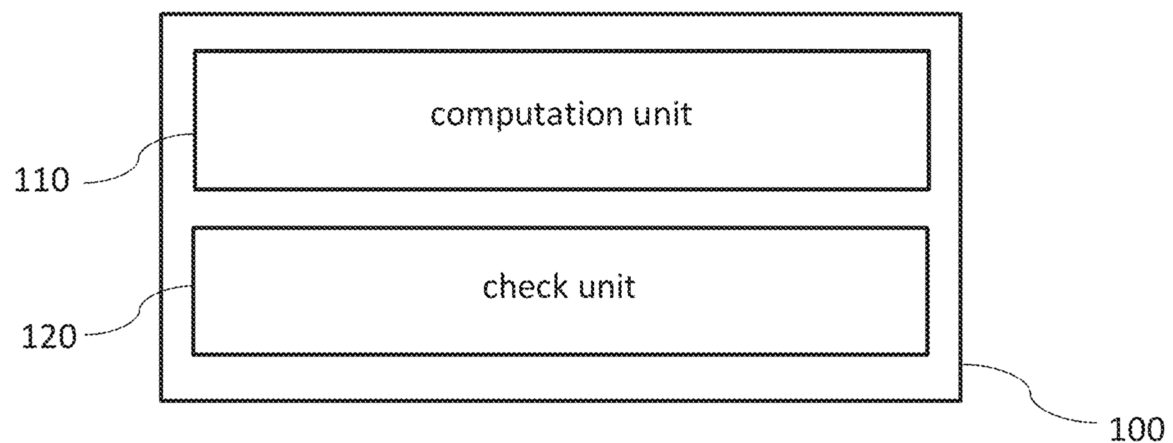
FIG. 1 is a block diagram illustrating a decoding device.

FIG. 1 shows a decoding device 100 for decoding a target information from a bitstream of video data, wherein the bitstream comprises a prediction parameter encoded in the bitstream.

The decoding device 100 comprising a computation unit 110 and a check unit 120.

The computation unit 110 is configured to calculate a randomized host signal based on the prediction parameter and a pseudo-random signal.

The check unit 120 is configured to apply a check function to the randomized host signal and to thereby obtain the target information.

The decoding device 100 can involve a signaling mechanism that is applicable to a wide variety of video coding techniques including compression and watermarking. In embodiments, the mechanism can be based on a data hiding procedure that is applied to motion vectors that are used in video coding to remove temporal redundancy in a video sequence, i.e. a motion vector is used as a host signal (referred to as the target signal) in which a message signal (referred to as the source signal) is hidden. Thus, a signaling overhead caused by explicit signaling (e.g., using CABAC or other entropy coders) can be used. For applications similar to digital watermarking the aim is to include a sequence of binary or non-binary symbols into a bit-steam without changing its syntax and significant video quality degradation.

Figure 2:
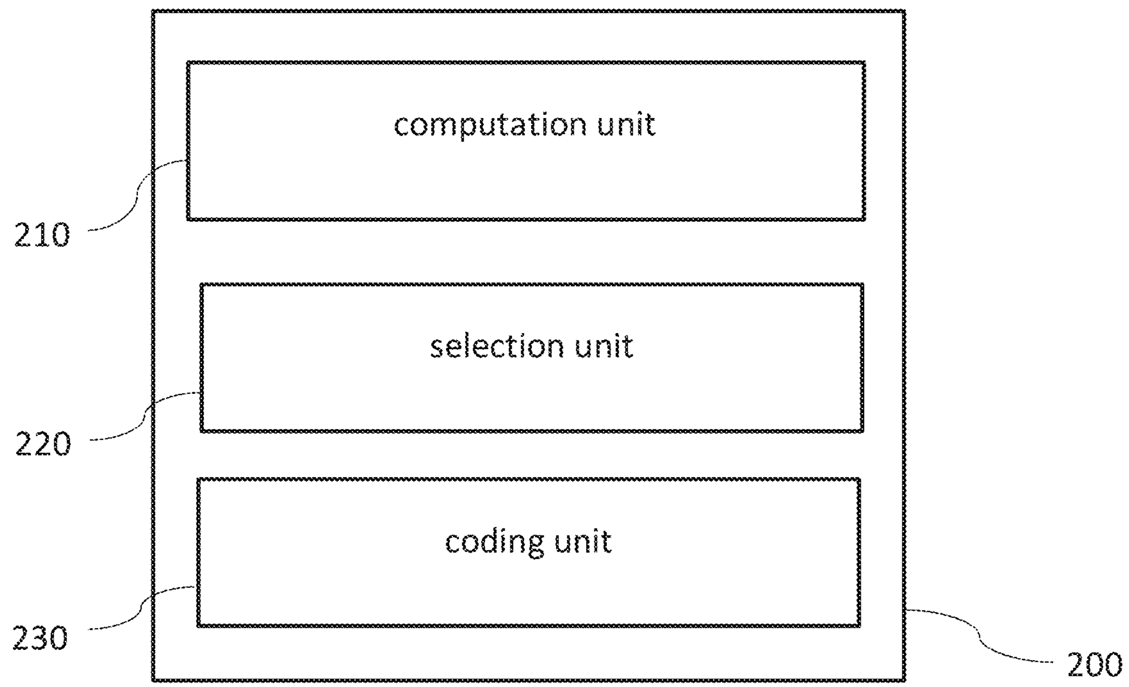
FIG. 2 is a block diagram illustrating a coding device.

FIG. 2 shows a coding device 200 for encoding a target information in a bitstream of video data.

The coding device comprises a computation unit 210, a selection unit and a coding unit 230.

The computation unit 210 is configured to, for a plurality of candidate prediction parameter values, calculate a randomized host signal based on the candidate prediction parameter value and a pseudo random signal.

The a selection unit 220 is configured to select from the plurality of candidate prediction parameter values a target prediction parameter value for which a check function yields the target information when the check function is applied to the randomized host signal calculated for the target prediction parameter value.

The coding unit 230 is configured to encode the target prediction parameter value in the bitstream.

The coding device 200 can be configured such that it encodes a target information in a way that it can be decoded by the decoding device 100 of FIG. 1.

Figure 3:
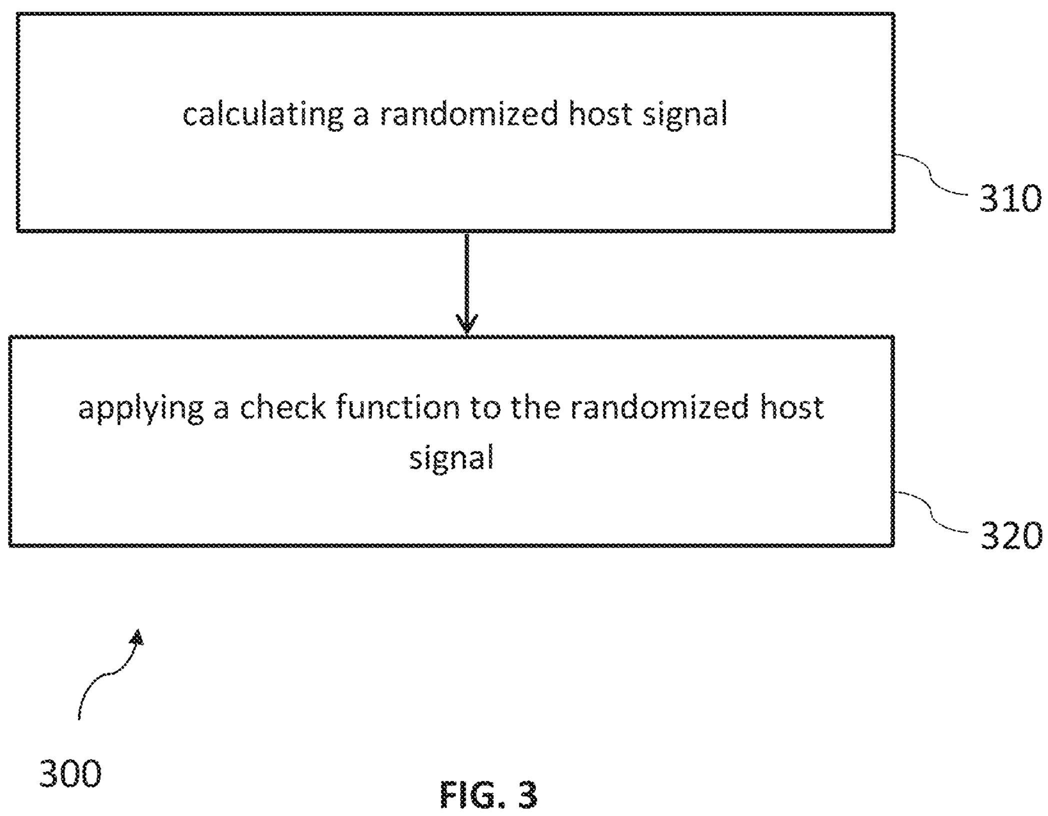
FIG. 3 is a flow chart of a method for decoding a target information from a bitstream of video data.

FIG. 3 shows a method for decoding 300 a target information from a bitstream of video data, wherein the bitstream comprises a prediction parameter encoded in the bitstream.

The method comprises a first step of calculating 310 a randomized host signal based on the prediction parameter and a pseudo random signal.

The method comprises a second step of applying 320 a check function to the randomized host signal to thereby obtain the target information.

The method 300 can be performed, e.g., by the decoding device 100 of FIG. 1.

Figure 4:
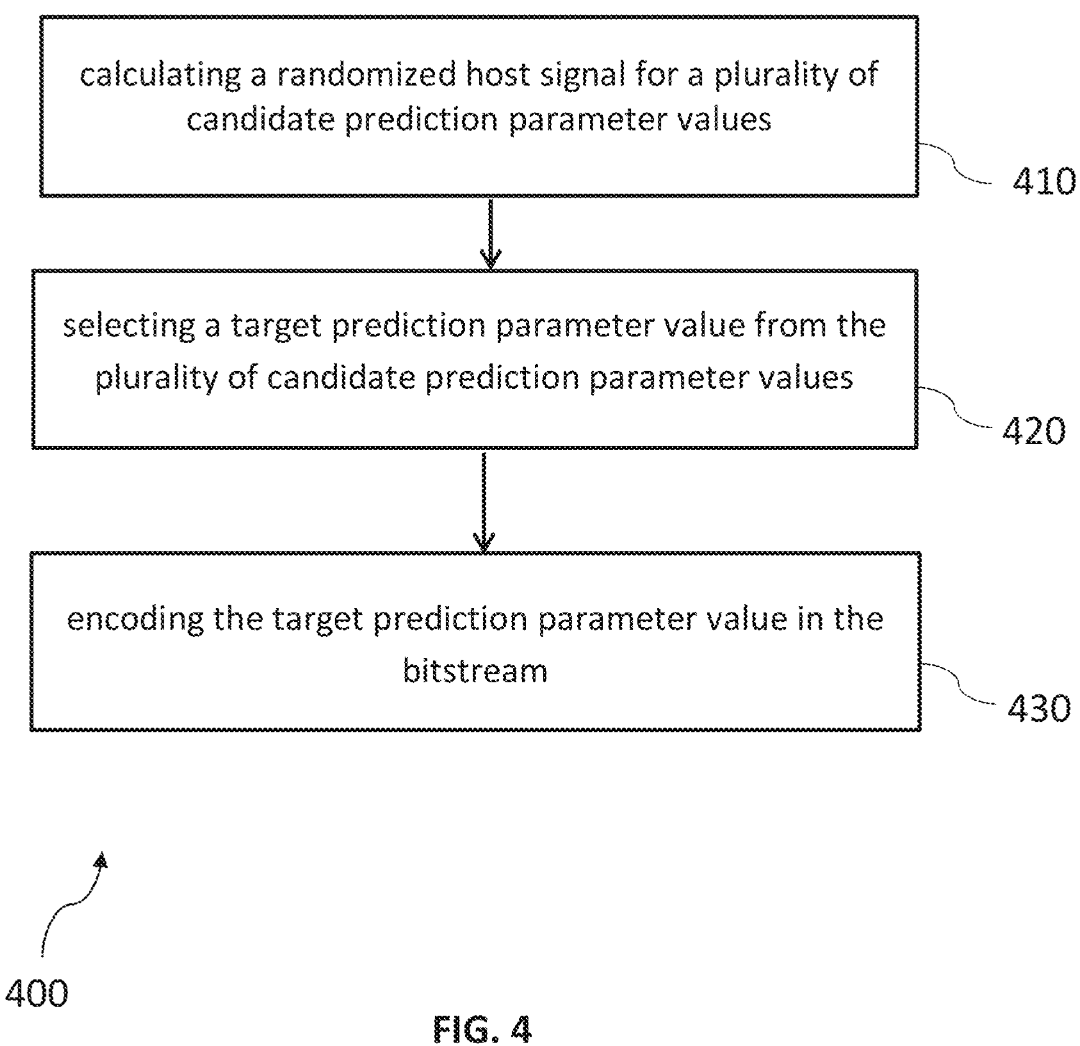
FIG. 4 is a flow chart of a method for encoding a target information in a bitstream of video data.

FIG. 4 shows a method for encoding 400 a target information in a bitstream of video data.

The method 400 comprises a first step 410 of, for a plurality of candidate prediction parameter values, calculating a randomized host signal based on the candidate predictor parameter value and a pseudo random signal.

The method 400 comprises a second step 420 of selecting a target prediction parameter value from the plurality of candidate prediction parameter values for which a check function yields the target information when the check function is applied to the randomized host signal calculated for the selected target prediction parameter, and The method 400 comprises a third step 430 of encoding the target prediction parameter value in the bitstream.

The method 400 can be performed, e.g., by the coding device 200 of FIG. 2.

Figure 5:
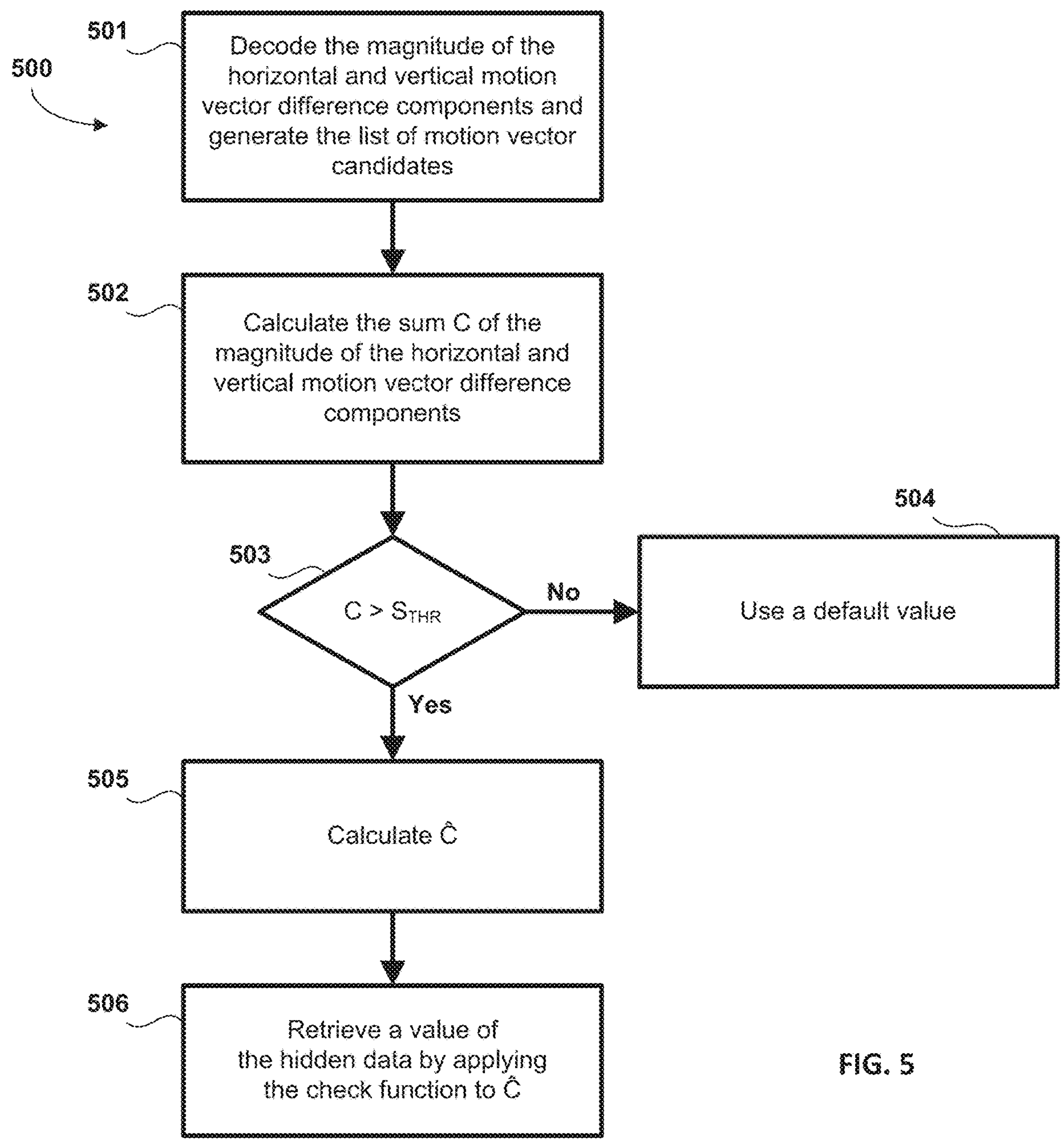
FIG. 5 is a flow chart of a method for retrieving hidden data from motion vectors.

FIG. 5 shows a flow chart of a method 500 for retrieving hidden data from motion vectors. The hidden data can, e.g., comprise a target information. It does not matter what kind of information is represented by these values. In the example, the motion vectors are derived at the decoder side (e.g., as in H.265) but the method could also be used in a codec in which they are encoded explicitly in the bitstream (as in earlier video codecs).

The method 500 begins with a first step 501 in which a list of motion vector candidates is generated and the magnitude of the horizontal motion vector difference component and the magnitude of the vertical motion vector difference component are decoded from the bitstream.

In a second step 502, the decoder calculates the sum C of the magnitudes of the horizontal and vertical motion vector difference components, e.g., according to the equation:

$$C=(|\Delta mv_x^{cur}|+|\Delta mv_y^{cur}|) \quad (2).$$

Then, in a third step 503, the decoder determines whether C is larger than a threshold value. The threshold value may be specified in a picture header, frame header or slice header, or may be otherwise communicated from the encoder to the decoder. If the threshold value is not communicated explicitly, the threshold value may be a default predetermined value.

If the sum C does not exceed the threshold, either a default value is assigned to the data or the data is read from the bitstream (fourth step 504). The decision which of these two actions is carried out should be made subject to the statistics of the data to be hidden.

Otherwise (i.e. if C exceeds the threshold), the host signal C is randomized in fifth step 505 by adding a (pseudo) random signal R:

$$f:\hat{C}=C+R \quad (3)$$

C and R are the same in encoding and decoding. The data is hidden in the sum of C and R. This is explained further below. There are various possible choices for generating R. One option (not shown) is to generate identical pseudorandom numbers at both the encoder and the decoder sides using a pseudorandom number generator.

Another option (shown in the flowchart) is to generate the random signal R based on motion vector candidates from the list generated in 501, e.g., according to the equation:

$$R=\sum_{i=0}^{k-1}(|mv_{ix}^{mvc}|+|mv_{iy}^{mvc}|), \quad (4)$$

where $\Delta mv_x^{cur}$ and $\Delta mv_y^{cur}$ are the horizontal (x-) and vertical (y-) components of motion vector differences, respectively; the index i refers to the i-th motion vector candidate (i=0, 1, . . . , k), and $mv_{ix}^{mvc}$ and $mv_{iy}^{mvc}$ are the horizontal (x-) and vertical (y-) components of the i-th motion vector candidate (cf. FIG. 6), respectively.

In sixth step 506, the hidden data is retrieved by applying the check function (e.g., parity check function, modulo-3 addition, etc.) to $\hat{C}$.

Figure 6:
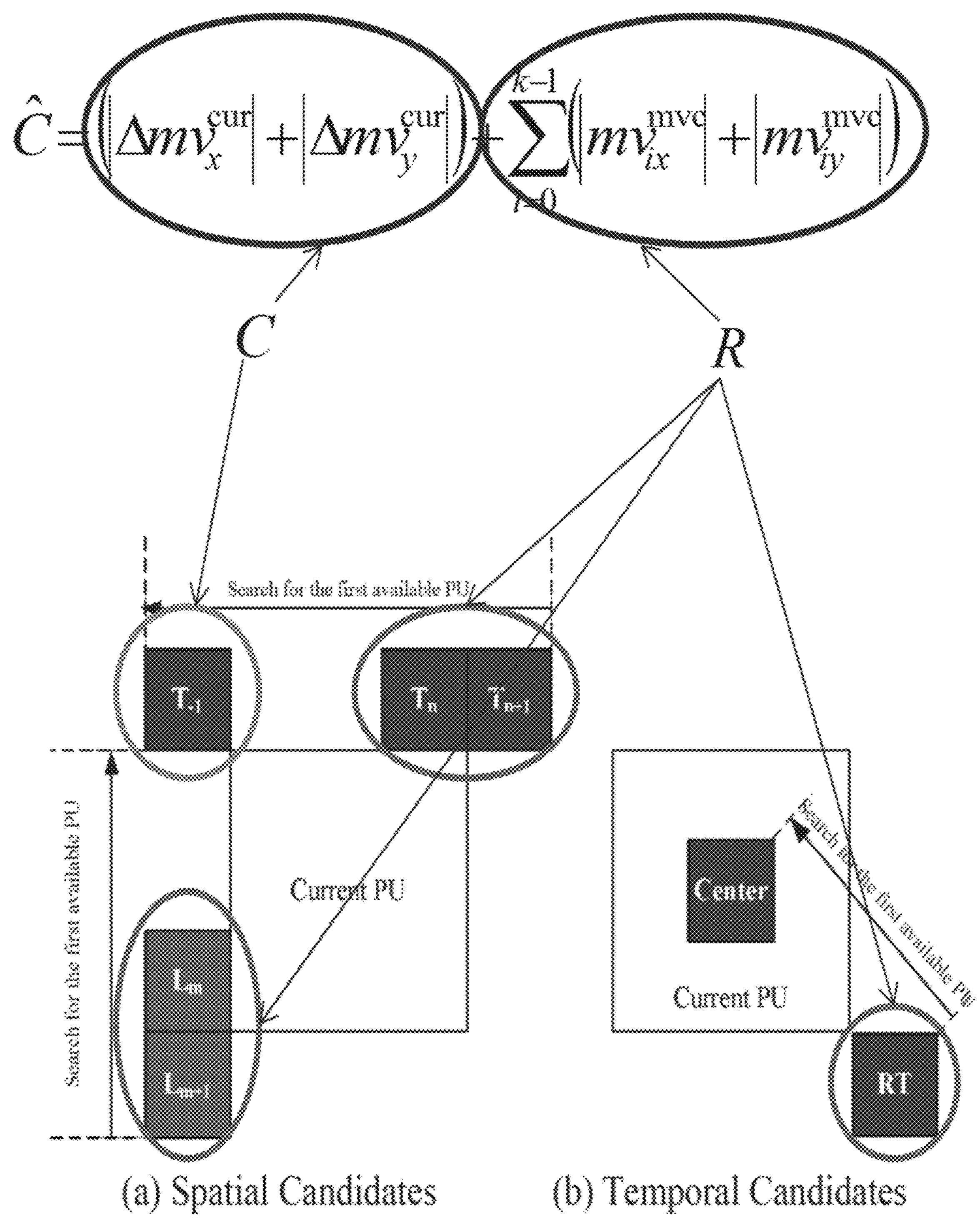
FIG. 6 is a schematic illustration of randomized data hiding in motion vectors.

FIG. 6 shows a schematic illustration of randomized data hiding in motion vectors. The currently processed PU (current PU) is considered and it is explained how a list of motion vector candidates for the current PU can be generated and C for the current PU can be randomized.

In the HEVC/H.265 standard and the HM software, this list is composed of both spatial and temporal candidates. The spatial candidates are classified into 2 categories, i.e. top (Tn−1, Tn and Tn+1) and left category (Lm and Lm+1) as shown in FIG. 6(*a*). In each category, the first existed and non-intra coded candidate in the search order is added to the list. After the spatial candidates are derived, a temporal candidate from the collocated frame is added to the list as shown in FIG. 6*b*. Therefore, the candidate list contains two spatial candidates and one temporal candidate at most. Obviously, the list of motion vector candidates can be extended as done in the JEM software.

In order to achieve maximal gain from hiding the message signal (source signal), a condition on its distribution must be respected if the target and the source signal characteristics used to embed the information are uncorrelated. For example, when hiding a binary element in a binary function of the target signal (such as hiding a bit in the parity), a change in the target signal will be required in about 50% of all cases. Therefore, the rate-distortion loss induced by this change is approximately constant and independent of the distribution of the source signal: for example, hiding a binary syntax element that is always equal to 0 results in the same loss, because the parity still has to be changed half of the time. On the other hand, the gain obtained by omitting the transmission of the source signal is maximal when the source signal reaches its upper coding bound of 1 bit per symbol (in the case of a binary element) when encoded in the bitstream. Therefore, one should select an equiprobable syntax element for the source signal.

According to the above-formulated principles, both the source signal (syntax element to be hidden) and the target signal (signal where the source signal should be hidden and is also referred to as the host signal) should be uniformly distributed to achieve maximal gain from hiding.

Figure 7:
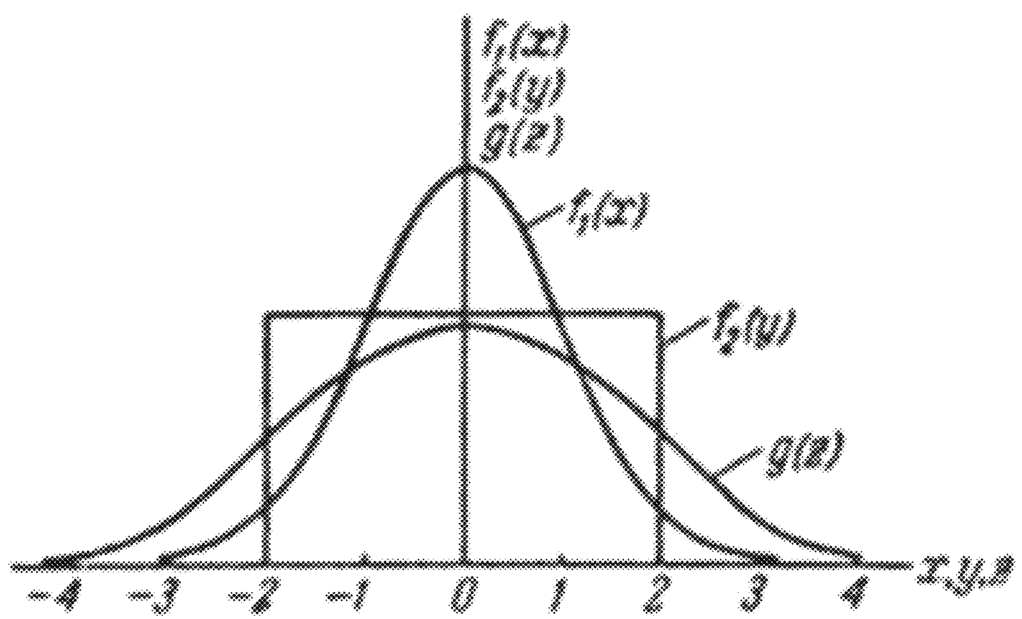
FIG. 7 is a diagram illustrating the result g(z) of adding a uniformly distributed signal $f_2$ (Y) to a non-uniformly distributed signal $f_1(x)$.

FIG. 7 shows the result g(z) of adding a uniformly distributed signal $f_2(y)$ to a non-uniformly distributed signal $f_1(x)$.

FIG. 7 illustrates the probability density functions (pdf) for 3 signals. As can be seen from FIG. 7, adding the uniformly distributed signal $f_2(y)$ to the non-uniformly distributed signal $f_1(x)$ results in getting the more uniformly distributed signal g(z) that suits more for hiding than $f_1(x)$. In fact, this process that is mathematically described as a convolution of two probability density functions for the uniformly distributed random signal R and the non-uniformly distributed random signal C to get such a host (target) signal $\hat{C}$ that is distributed more uniformly. Thus, adding a uniformly distributed signal to a non-uniformly distributed one can result in a more uniformly distributed signal that allows us to improve the compression performance of the hiding procedure.

In other words, we add a uniformly distributed signal to a non-uniformly distributed one to get a more uniformly distributed resultant signal. As described above, the host (target) signal should be uniformly distributed to provide higher compression efficiency.

Figure 8:
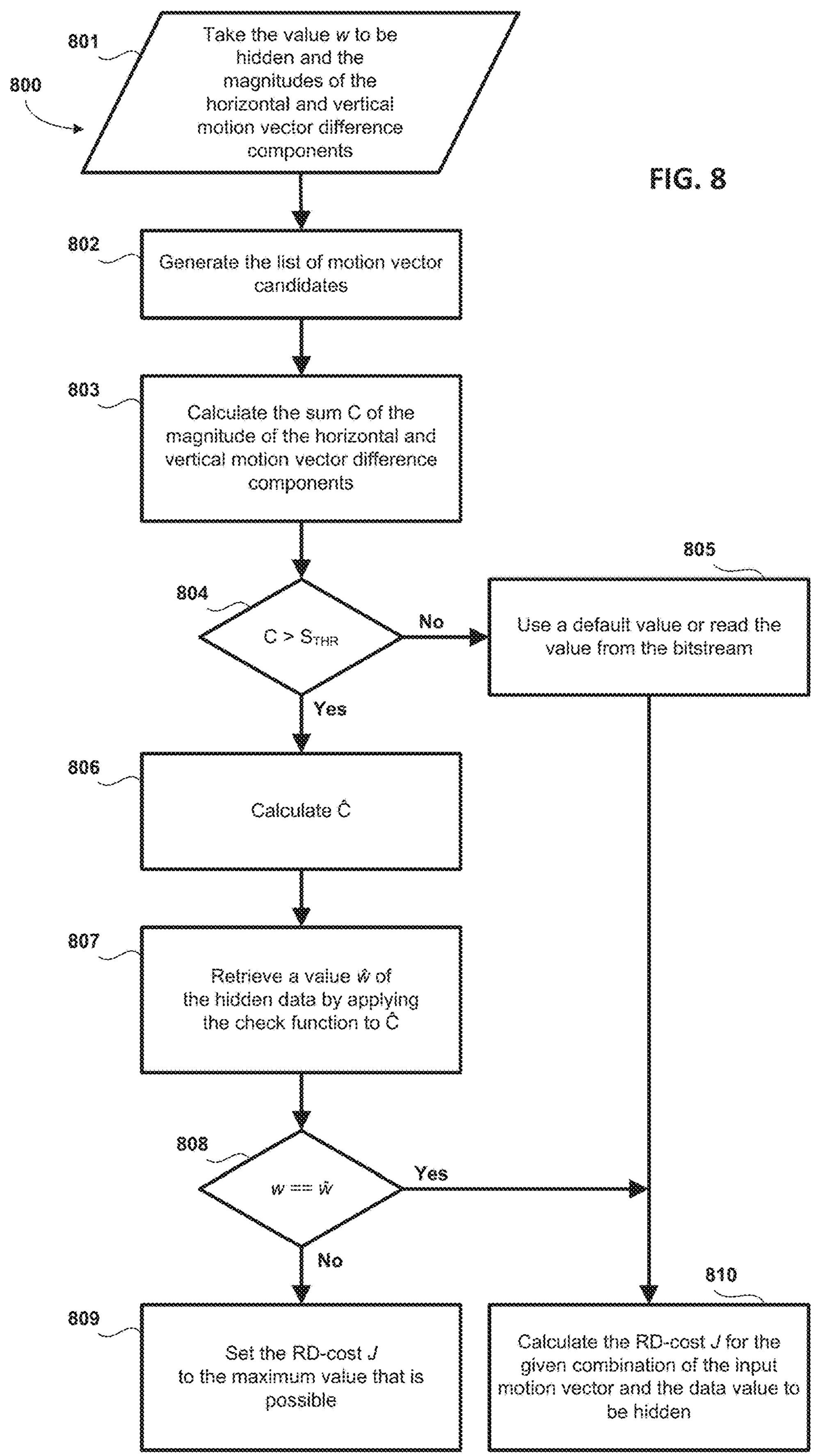
FIG. 8 is a flow chart of a method of data hiding in motion vectors at the encoder side.

FIG. 8 shows a flow chart of a method of encoding target information in motion vectors at the encoder side.

The method 800 begins with a first step 801 where the values of input parameters such as the target information value w to be hidden and the magnitudes of the horizontal and vertical motion vector difference components are initialized.

In a second step 802, the list of motion vector candidates is generated.

In a third step 803, the decoder calculates the sum C of the magnitudes of the horizontal and vertical motion vector difference components.

Then, in a fourth step 804, the decoder determines whether C is larger than a threshold value. The threshold value may be specified in a picture header, frame header or slice header, or may be otherwise communicated from the encoder to the decoder. If the threshold value is not communicated explicitly, the threshold value may be a default predetermined value.

If the sum C does not exceed the threshold, either a default value is assigned to the data or the data is read from the bitstream (in a fifth step 805). The decision which of these two actions is carried out should be made subject to the statistics of the data to be hidden.

Otherwise (i.e. if C exceeds the threshold), the host signal C is randomized by adding a (pseudo)random signal R as shown (2). In particular, motion vector candidates taken from the list generated in second step 802 can be used to generate the random signal R. Thus, the following formulas (3a) and (3b) are used. In a seventh step 807, the hidden value $\hat{w}$ is retrieved by applying the check function (e.g., parity check function, modulo-3 addition, etc.) to $\hat{C}$. In an eighth step 808, the decoder determines whether w is equal to $\hat{w}$. If not, the RD-cost J is set to the highest value. If w is equal to $\hat{w}$, a real val value of the RD-cost J is calculated for the given combination of the input motion vector and the data value to be hidden. The method 800 of FIG. 8 can be part of an RD-optimization procedure where the minimal RD-cost $J_{min}$ is selected among a set of calculated RD-costs $J_i$:

$$J_{min} = \min_i(J_i) \tag{5}$$

Since data hiding in motion vectors is possible when their precision is redundant, it is important to enable and disable data hiding adaptively subject to the features of encoded content. The most evident way is to signal whether data hiding is enabled or not. For example, it can be done by using a binary flag for inter-coded PU. However, such a mechanism increases the signaling overhead but data hiding is aimed at reducing it.

Another way is to detect such motion vectors that have redundant precision. If motion vector has redundant precision, then data hiding is enabled. Otherwise, it is disabled and information that would be hidden is explicitly processed by an entropy codec (e.g., CABAC). Such a mechanism should identically work at both encoder and decoder sides to have a decodable bit-stream.

Figure 9:
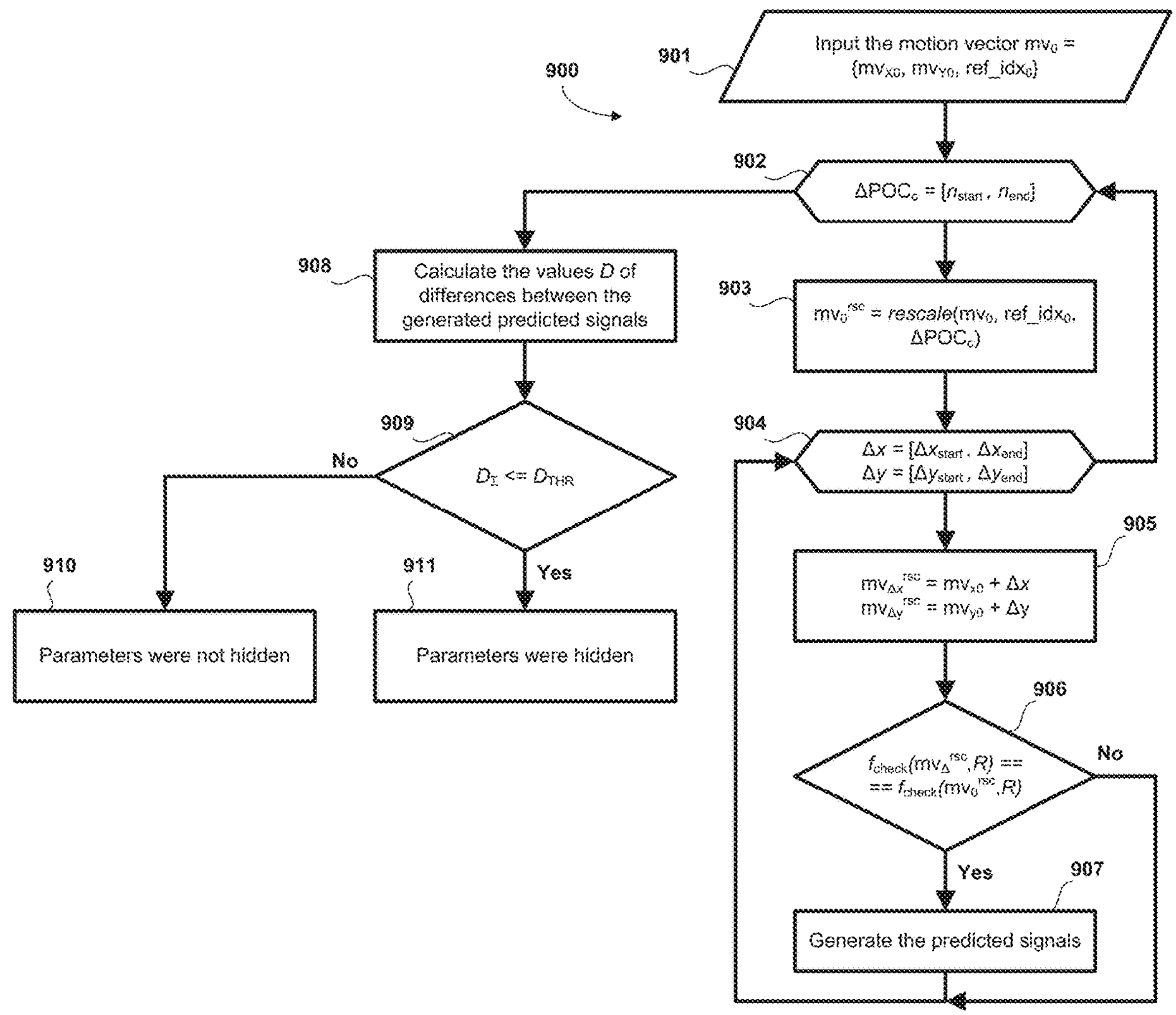
FIG. 9 is a flow chart of a method for detecting whether parameters were hidden in motion vectors.

FIG. 9 presents an algorithm of how to detect the redundancy in motion vectors for both encoder and decoder. It is based on the fact that depending on the content of the video data being encoded it may be possible that during inter-prediction for different motion vectors the similar inter-predicted blocks could be generated.

In a first step 901 the input motion vector is provided, in particular values of a motion vector projections $mv_{x0}$ and $mv_{y0}$ onto x and y axes, respectively, as well as the reference frame index $ref\_idx_0$. For the given input the algorithm provides the decision (909) on whether the input motion has hidden parameters (911) or it does not (910). It is guaranteed that for the given PU and the same input motion vector (901) both encoder and decoder will provide the same decision (909), because encoder and decoder uses the same steps on the rest of the steps (902-908) described further.

A second step 902 defines a set of frames in the decoded picture buffer (DPB), e.g. by specifying a range of picture order counts (POCs). For each of the frames indicated by $\Delta POC_c$ input vector is scaled (903) to obtain scaled vector $mv_0^{rsc}=(mv_{x0}^{rsc}, mv_{y0}^{rsc})$. A scaling step 903 could be performed the similar way as specified by equations 8-149 . . . 8-153 of [8.5.3.2.7 Derivation process for motion vector predictor candidates, Recommendation ITU-T H.265 04/2015]. Initial scaling factor is determined by values of $ref\_idx_0$ and POC of the picture being decoded. A new scaling factor value is determined similarly by the values of $\Delta POC_c$ and POC of the picture being decoded. A new rescaled vector $(mv_{x0}^{rsc}, mv_{y0}^{rsc})$ is derived from by multiplying $mv_{x0}$ and $mv_{y0}$ respectively by the ratio of new scaling factor to the initial scaling factor. Step 904 consists in defining a search area within selected frame $\Delta POC_c$. This area is a set of subpixel offsets and might have different shapes, e.g., a rectangular one. In the latter case it is defined by horizontal and vertical offset ranges. Step 905 consists in obtaining new motion vector ($mv_{\Delta x}^{rsc}$, $mv_{\Delta y}^{rsc}$) from the scaled motion vector ($mv_{\Delta x}^{rsc}$, $mv_{\Delta y}^{rsc}$). This could be performed by adding the selected offset to the scaled motion vector:

$$mv_{\Delta x}^{rsc}=mv_{x0}+\Delta x, mv_{\Delta y}^{rsc}=mv_{y0}+\Delta y.$$

Step 906 checks whether a motion vector obtained at step 905 provides the same value of a check function as motion vector resulted at step 903. If these values are the same prediction signal is generated (step 907) for the scaled motion vector ($mv_{\Delta x}^{rsc}$, $mv_{\Delta y}^{rsc}$). If these values are different step 907 is skipped for the subpixel offset being checked. Further processing consists in repeating steps 905-907 to check the rest of subpixel offsets defined at step 904. When all the subpixel offsets are checked, steps 903-907 are repeated as described earlier for the rest of frames defined at step 902.

It is noteworthy that step 906 uses a check function that besides a motion vector may also use random signal R. This random signal R is used to randomize the values of motion vectors as described in FIG. 6 in order to get a statistical distribution of the host signal (motion vectors) that is more beneficial for data hiding.

Final processing described in FIG. 9 comprises two steps: determination of differences between generated predicted signals (step 908); and applying a threshold $D_{THR}$ to the integral value $D_\Sigma$ of these differences in order to make the decision on whether hiding should be performed or not. Step 908 takes predicted signals generated at step 907 as the input. For each of these predicted signals the value of difference D is determined, e.g., as an absolute sum of differences between the predicted signals and the averaged predicted signal. This averaged predicted signal could be obtained by pixelwise averaging of all the predicted signals generated at step 907. Obviously, different averaging techniques could be applied including, but not limited to taking arithmetic or geometric mean, taking median value and skipping some of the input predicted signals (e.g. in case of outliers).

A resulting difference value $D_\Sigma$ is compared to a threshold at step 909. When $D_\Sigma$ is lesser or equal than a threshold value it means that there several predicted signals generated at step 907 are close to each other and hence there could be a redundancy in motion vector coding. This redundancy could be used by data hiding and therefore step 911 turns data hiding on for the PU being processed and motion vector defined at step 901. Besides condition mentioned at step 909 other constraints could be applied as well, e.g., the quantity of input predicted signals or this quantity after removing the outliers. Constraints on statistical properties of predicted block could also be applied, such as standard deviation or a difference between maximum and minimum values. Threshold values may also depend on rate control settings, e.g., quantization parameter value.

The algorithm of FIG. 9 can be applied both during encoding and during decoding.

Figure 10:
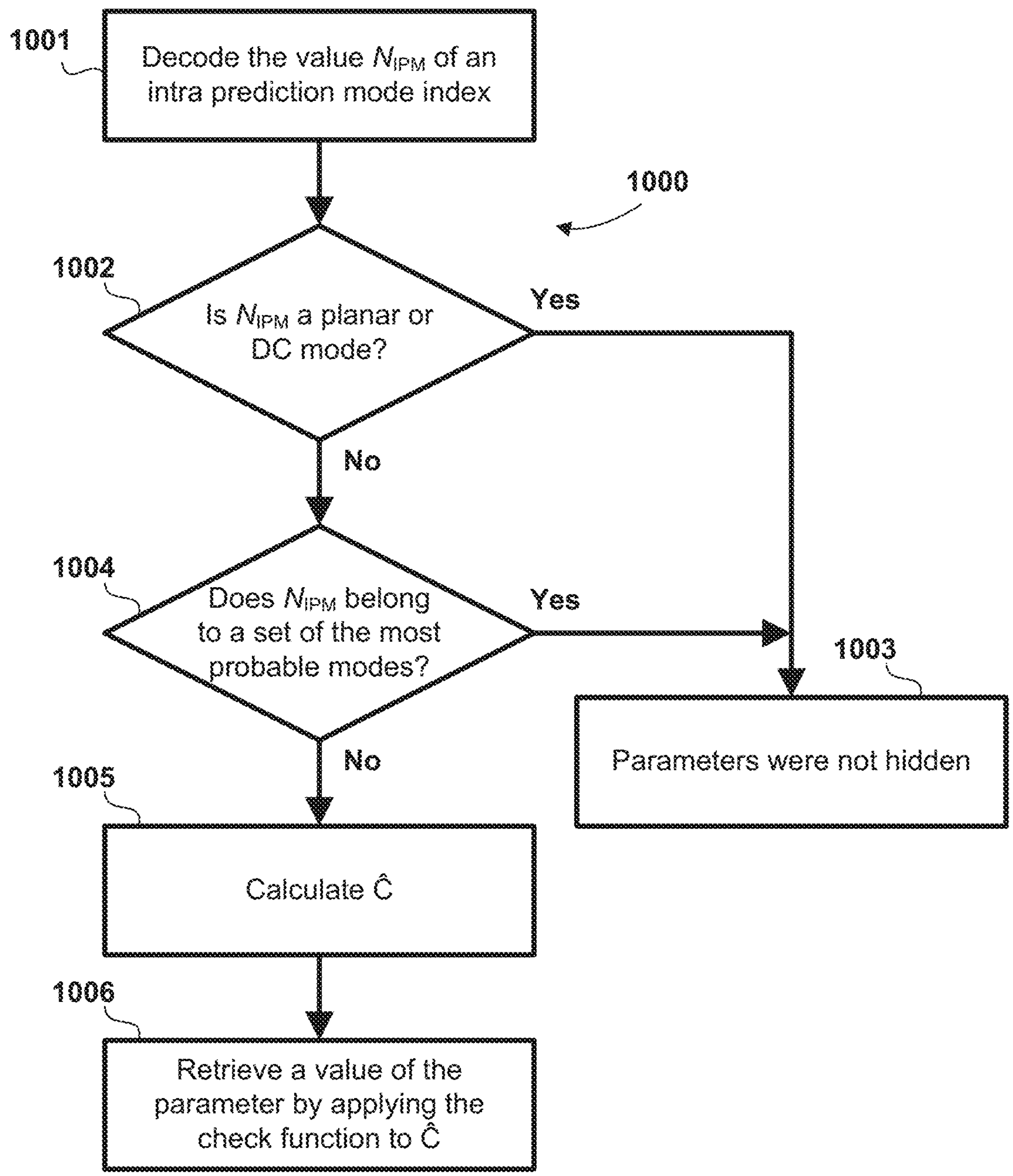
FIG. 10 is a flow chart of a further method for hiding data in intra-prediction mode indices.

FIG. 10 shows a flow chart of a further method 1000 for hiding data in intra-prediction mode indices.

A similar approach can be applied to intra-predicted blocks. In this case, the intra prediction mode index is used as a host signal as shown in FIG. 10. In this case, some intra prediction mode indices (e.g., such that corresponds to DC, planar and the most probable modes) are disabled for hiding to avoid degradation of compression performance and to avoid signaling overhead. Different options exist for defining and generating the randomized signal that should be added to the host signal. One option is to choose as the randomized signal the number of positive or negative significant transform coefficients in one of the previous TUs.

In general, the main steps of the algorithm shown in FIG. 10 can be implemented similarly to the steps shown in FIG. 5.

In a first step 1001 of the method 1000, an index of an intra prediction mode is decoded from bitstream. In a second step 1002 it is determined whether the intra prediction mode is directional. In case of H.265 it compares the input mode index to the indices of planar and DC mode. If the input mode index is equal to either planar or DC index it means that the input intra prediction mode is not directional. In this case it is considered (1003) that parameters are not hidden within an intra prediction mode parsed at first step 1001. A same decision is taken 1004 in case input intra prediction mode belongs to the set of the most probable modes. This set could be defined, e.g., as list of candidate modes specified by steps 3 and 4 of [8.4.2 Derivation process for luma intra prediction mode, Recommendation ITU-T H.265 04/2015]. Otherwise steps 1005 and 1006 are consequently performed. These steps do not differ from steps 505 and 506, respectively.

The method of FIG. 10 could be used at the encoder side. However, instead of decoding an input value at the first step 1001 this value could be assigned within an RDO loop.

Since data hiding in intra-prediction mode indices is possible when the number of intra-prediction modes is redundant, it is important to enable and disable data hiding adaptively subject to the features of encoded content. The most evident way is to signal whether data hiding is enabled or not. For example, it can be done by using a binary flag for intra-coded PU. However, such a mechanism increases the signaling overhead but data hiding is aimed at reducing it.

Another way is to calculate the difference between intra-predicted signals to detect such cases when the number of intra-prediction modes is redundant and, therefore, data hiding in intra-prediction mode can be enabled. Otherwise (if it is disabled), information that would be hidden is explicitly processed by an entropy codec (e.g., CABAC). Such a mechanism should identically work at both encoder and decoder sides to have a decodable bit-stream.

Figure 11:
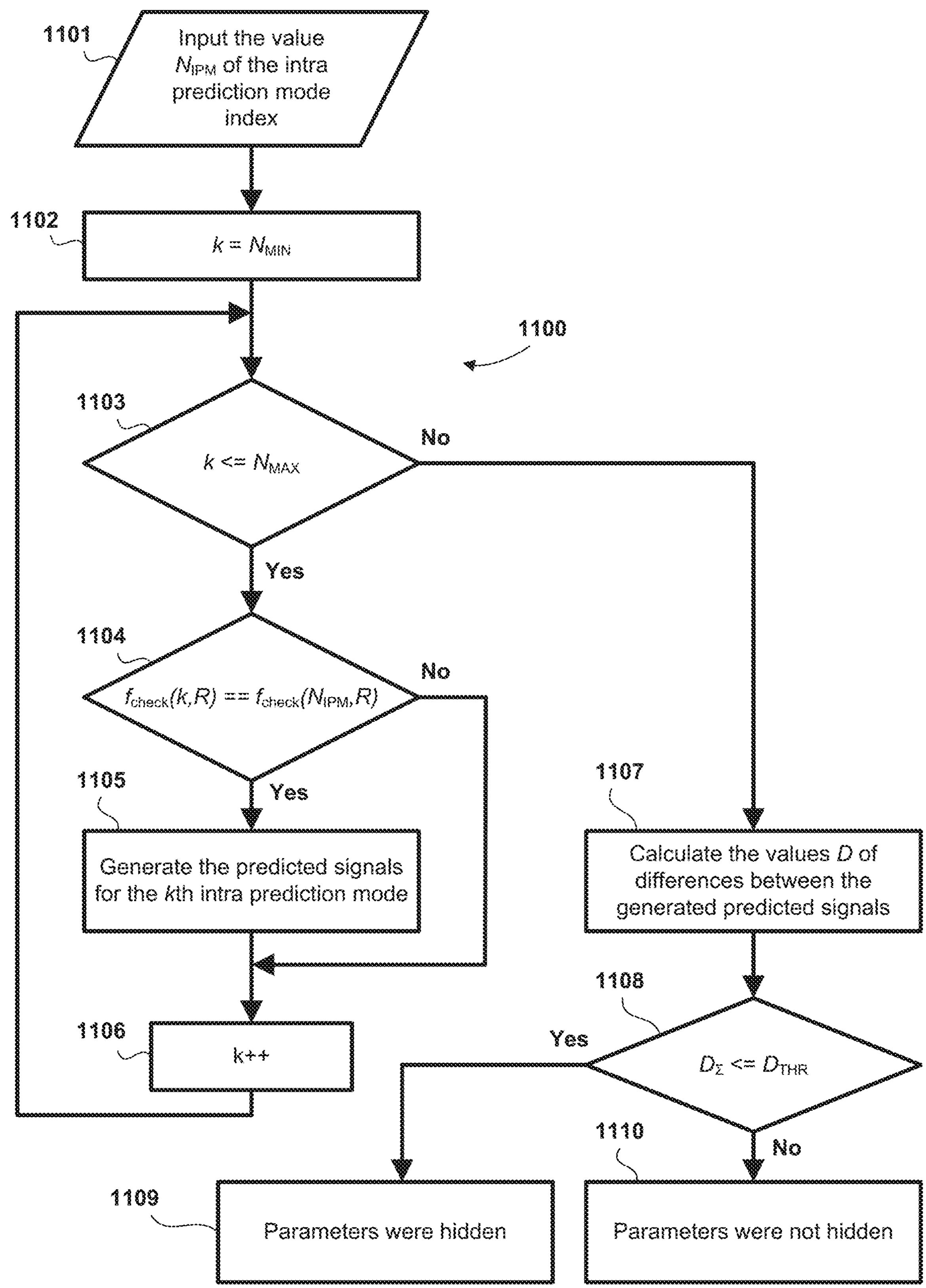
FIG. 11 is a flow chart of a method for detecting redundancy in intra-prediction mode indices.

FIG. 11 shows a flow chart of a method 1100 for detecting redundancy in intra-prediction mode indices.

The method is applicable on both encoder and decoder sides. A first step 1101 differs for encoding and decoding processes by a source of an input intra prediction mode index NIPM. For the encoder side NIPM is assigned within and RDO loop, and for the decoder side NIPM is decoded from a bitstream. Further steps 1102, 1103 and 1106 define an iterative process for a set of intra prediction modes. Specifically, a range between NMIN and NMAX is used to define this set. However, this set of intra prediction modes could be defined differently, e.g., depending on the value of NIPM. Steps 1104, 1105 and 1107-1110 are similar to steps 906-911 of the method of FIG. 9. Besides of the difference in host signal, step 1105 is different from steps 907 by the prediction process being used. At step 1105, the predicted signal is generated by an intra-prediction process instead of inter-prediction process.

Figure 12:
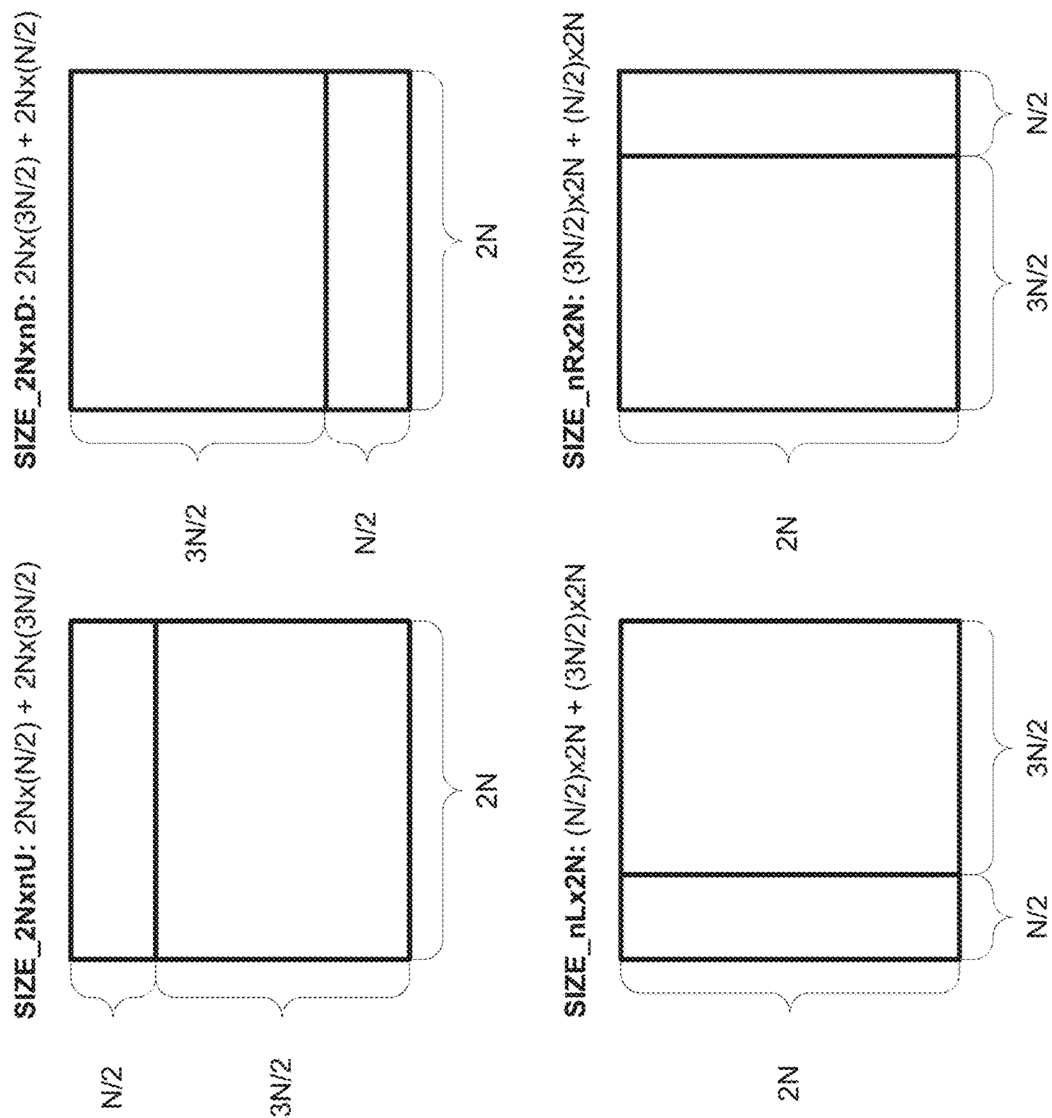
FIG. 12 is a schematic illustration of data hiding in intra prediction mode indices.
Figure 13:
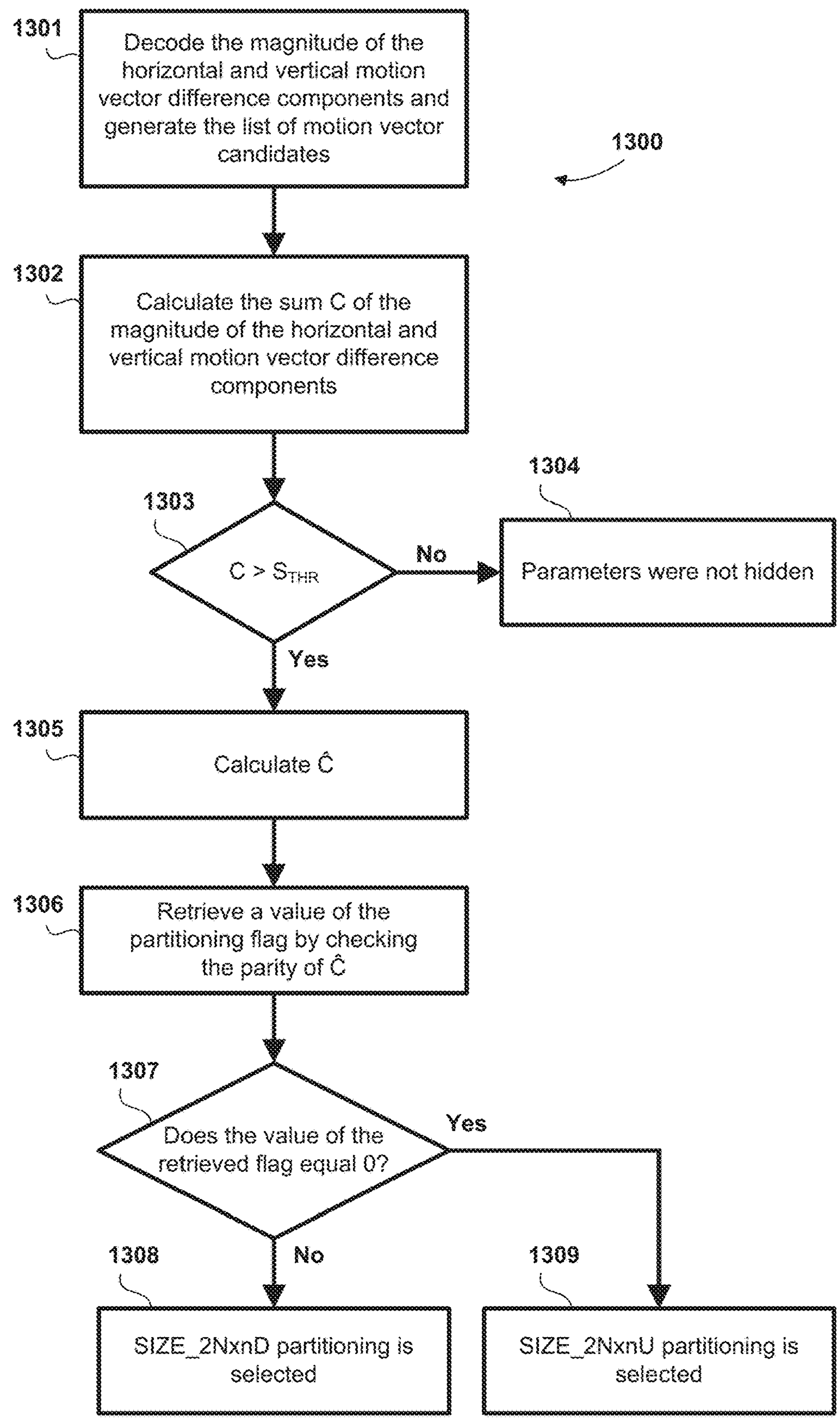
FIG. 13 is a flow chart of a method for hiding a partitioning flag in motion vectors.

FIG. 12 shows a schematic illustration of data hiding in intra prediction mode indices and FIG. 13 shows a flow chart for a method 1300 for hiding a partitioning flag in motion vectors.

Step 1301-1306 of the method 1300 of FIG. 13 are similar to steps 501-506 of the method 500 of FIG. 5, respectively. Step 1307 checks whether the value of the flag retrieved at step 1306 is equal to zero. Depending to the result of the comparison performed at step 1307 partitioning process 1308 or 1309 is selected. The steps 1308 and 1309 of selecting a partitioning are illustrated in FIG. 12.

In different situation (e.g., indicated by a flag within a bitstream) processes 1308 and 1309 may use SIZE_nL×2N and SIZE_nR×2N partitioning (see FIG. 12) respectively.

Figure 14:
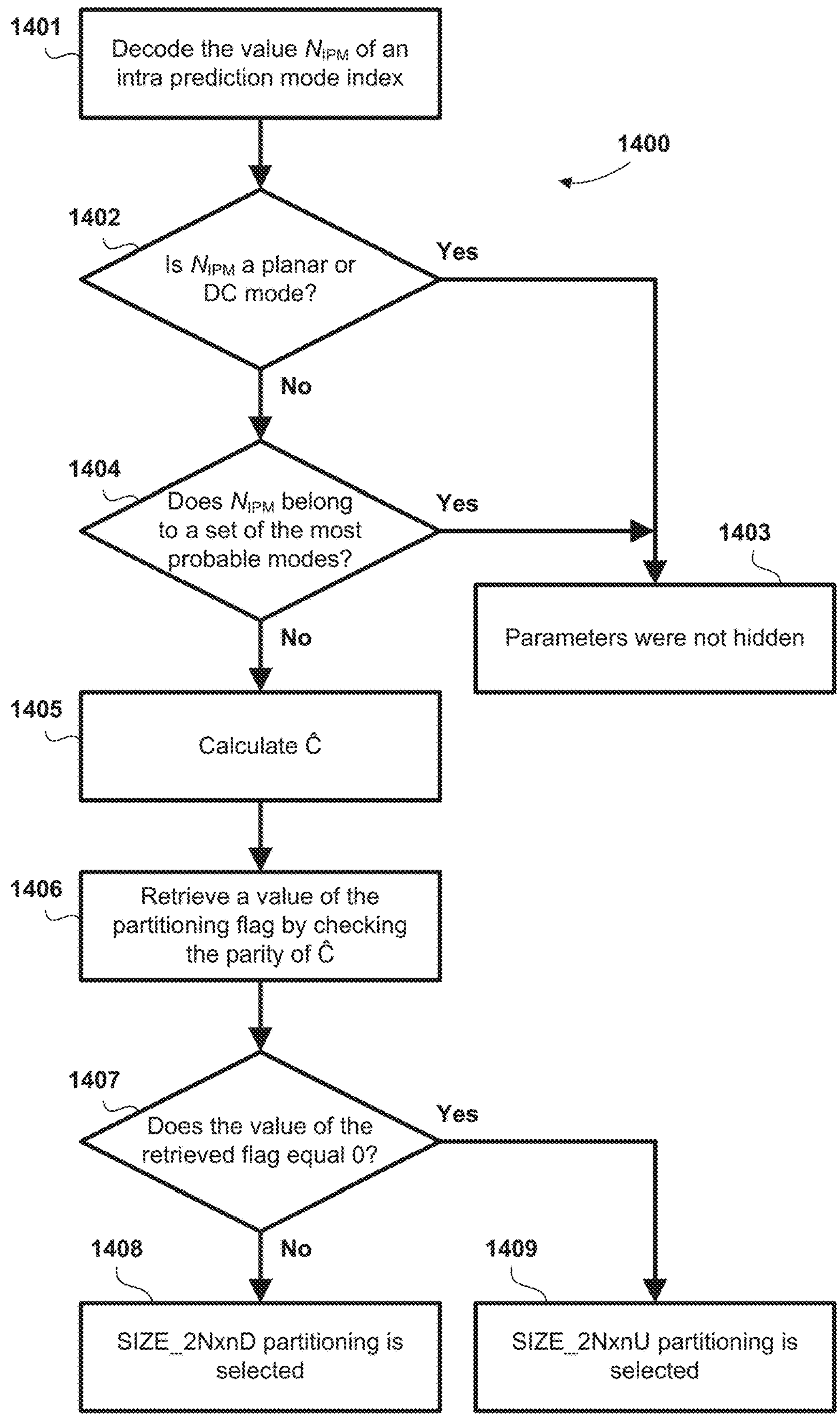
FIG. 14 is a flow chart of a method for hiding a partitioning flag in intra prediction mode indices.

FIG. 14 shows a flow chart for a method 1400 for hiding a partitioning flag in intra prediction mode indices.

To avoid computationally complex optimizations, the information to be hidden in motion vectors or intra prediction mode indices should relate to either the current processing step (i.e. prediction coding) or preceded ones (e.g., partitioning). In FIGS. 13 and 14, particular embodiments of the proposed invention are presented for the case when partitioning information related to asymmetric partitioning known as SIZE_2N×nU, SIZE_2N×nD, SIZE_nL×2N and SIZE_nR×2N explained in FIG. 12. In both the HM and JEM software, a flag of what of two available options is selected is entropy coded in the CABAC's bypass mode, i.e. it is assumed that the probability of each option is 50%. The first set of possible options contains SIZE_2N×nU and SIZE_2N×nD. The second set includes SIZE_nL×2N and SIZE_nR×2N.

In FIGS. 13 and 14, it is assumed that the flag values of 0 and 1 indicate the SIZE_2N×nU and SIZE_2N×nD modes, respectively. In other aspects, the algorithm charts are similar to the generalized diagrams presented in FIGS. 5 and 10.

Step 1401-1406 are similar to steps 1001-1006 (see FIG. 10) respectively. Step 1407 checks whether the value of the flag retrieved at step 1406 is equal to zero. Depending to the result of the comparison performed at step 1407 one of two partitioning step 1408 or 1409 is selected. These partitioning steps are illustrated in FIG. 12.

In different situation (e.g., indicated by a flag within a bitstream) processes 1408 and 1409 may use SIZE_nL×2N and SIZE_nR×2N partitioning (see FIG. 12) respectively.

The methods 1300 and 1400 presented in FIG. 13 and FIG. 14 can be applied at the encoder side as well. In this case, the first steps 1301 and 1401 will not get input data from the bitstream. Instead, this input data will be initialized within an RDO process.

As explained above in more detail, embodiments of the invention relate to methods of decoding video data of a PU, comprising decoding information on how to generate a reference and getting a uniformly distributed host signal by adding to the decoded information, a randomized signal using a predefined algorithm at both encoder and decoder sides.

Therein, the target information can be retrieved by applying a check-function (e.g., parity check function) to the uniformly distributed host signal. Preferably, motion vector differences can be used as the information for generating a reference or intra prediction mode indices can be used as the information for generating a reference.

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:

1. A decoding device for decoding target information from a bitstream of video data, wherein the bitstream comprises a prediction parameter encoded in the bitstream, the decoding device comprising one or more processors configured to:

obtain a randomized host signal based on the prediction parameter and a pseudo-random signal, wherein the pseudo random signal is determined based on motion vector candidates according to the following:

$$R = \sum_{i=0}^{k-1} (|mv_{ix}^{mvc}| + |mv_{iy}^{mvc}|),$$

wherein R is the pseudo random signal, $mv_{ix}^{mvc}$ is an horizontal component of an i-th motion vector candidate, $mv_{iy}^{mvc}$ is a vertical component of an i-th motion vector candidate, and k is a number of motion vectors; and apply a check function to the randomized host signal so as to obtain the target information.

2. The decoding device of claim 1, wherein the prediction parameter comprises at least one of: (a) a motion vector difference and (b) an intra-prediction mode index.

3. The decoding device of claim 1, wherein the pseudo random signal is determined based on syntax elements of the bitstream which are coded in a bypass mode.

4. The decoding device of claim 1, wherein the motion vector candidates are taken from a merging candidate list.

5. The decoding device of claim 1, wherein the randomized host signal is obtained by summing a non-randomized host signal, which is based on the prediction parameter and the pseudo-random signal.

6. The decoding device of claim 5, wherein the non-randomized host signal is obtained through the following:

$$C=(|\Delta mv_x^{cur}|+|\Delta mv_y^{cur}|)$$

wherein C is the non-randomized host signal, $\Delta mv_x^{cur}$ is a horizontal component of a motion vector decoded from the bitstream, and $\Delta mv_y^{cur}$ is a vertical component of a motion vector decoded from the bitstream.

7. A coding device for encoding target information in a bitstream of video data, the coding device comprising one or more processors configured to:

for a plurality of candidate prediction parameter values, obtain a randomized host signal based on a candidate prediction parameter value and a pseudo random signal, select from the plurality of candidate prediction parameter values, a target prediction parameter value for which a check function yields the target information when the check function is applied to the randomized host signal obtained for the target prediction parameter value, and encode the target prediction parameter value in the bitstream only in response to a non-randomized host signal based on the target prediction parameter value being larger than a predetermined host signal threshold.

8. The coding device of claim 7, wherein the prediction parameter comprises at least one of (a) a motion vector difference and (b) an intra-prediction mode index.

9. A method for decoding target information from a bitstream of video data, wherein the bitstream comprises a prediction parameter encoded in the bitstream, the method comprising:

obtaining a randomized host signal based on the prediction parameter and a pseudo random signal, wherein the pseudo random signal is determined based on motion vector candidates according to the following:

$$R = \sum_{i=0}^{k-1} (|mv_{ix}^{mvc}| + |mv_{iy}^{mvc}|),$$

wherein R is the pseudo random signal, $mv_{ix}^{mvc}$ is an horizontal component of an i-th motion vector candidate, $mv_{iy}^{mvc}$ is a vertical component of an i-th motion vector candidate and k is a number of motion vectors; and applying a check function to the randomized host signal so as to obtain the target information.

10. A method for encoding target information in a bitstream of video data, the method comprising:

for a plurality of candidate prediction parameter values, obtaining a randomized host signal based on a candidate predictor parameter value and a pseudo random signal, selecting a target prediction parameter value from the plurality of candidate prediction parameter values for which a check function yields the target information when the check function is applied to the randomized host signal obtained for the selected target prediction parameter, and encoding the target prediction parameter value in the bitstream only in response to a non-randomized host signal based on the target prediction parameter value being larger than a predetermined host signal threshold.

11. The method of claim 10, further comprising: deciding whether to encode the target information in the bitstream for a given prediction parameter value, including:

determining a plurality of equivalent prediction parameter values that yield a same check function as the given prediction parameter value, generating a plurality of predicted signals for the plurality of equivalent prediction parameter values, and deciding to encode the target information in the given prediction parameter value when a sum of differences of the plurality of predicted signals is smaller than a predetermined threshold.

12. The method of claim 10, wherein selecting the target prediction parameter value comprises: selecting a lowest-cost prediction parameter value, wherein the lowest-cost prediction parameter value has a lowest rate-distortion cost.

13. A non-transitory computer-readable storage medium storing program code, the program code comprising instructions which when executed by a processor carry out the method of claim 9.

14. A non-transitory computer-readable storage medium storing program code, the program code comprising instructions which when executed by a processor carry out the method of claim 10.

* * * * *